United States Patent [19]

Jordan

[11] 4,246,531
[45] Jan. 20, 1981

[54] CONSTANT FREQUENCY VARIABLE RPM GENERATOR

[76] Inventor: John E. Jordan, 441 S. 850 East, Orem, Utah 84070

[21] Appl. No.: 944,147

[22] Filed: Sep. 20, 1978

Related U.S. Application Data

[63] Continuation-in-part of Ser. No. 819,853, Aug. 18, 1977, abandoned.

[51] Int. Cl.³ .......................... H02P 9/42; H02P 9/48
[52] U.S. Cl. ........................................ 322/28; 322/32
[58] Field of Search ................................ 322/29–32, 322/59, 61, 17, 28; 310/112, 113

[56] References Cited

U.S. PATENT DOCUMENTS

| | | | |
|---|---|---|---|
| 3,070,740 | 12/1962 | Chirgwin et al. | 322/32 |
| 3,183,431 | 5/1965 | Ford | 322/61 X |
| 3,200,324 | 8/1965 | Wagner | 322/32 |

*Primary Examiner*—Robert J. Hickey
*Attorney, Agent, or Firm*—Trask & Britt

[57] ABSTRACT

A prime mover delivers rotational torque to a generator having an exciter and a main unit connected sequentially along the prime mover output shaft. A voltage sensor is connected to the generator output and supplies a signal reflective of the output voltage to a frequency source. The frequency source is connected to receive power from a secondary energy source associated with the prime mover. The frequency source supplies an output signal at a preselected frequency at variable power levels related to the magnitude of the generator output voltage. The frequency source output is connected to the stator of the exciter to generate the magnetic field therein which rotates directionally with respect to the rotational direction of the prime mover output shaft to generate an output of preselected frequency. The rotor of the exciter has an output which is connected to the rotor of the main unit of the generator to generate in the main unit a magnetic field which rotates directionally relative to the direction of rotation of the prime mover output shaft to generate an output signal at a frequency independent of prime mover shaft rotational rate. The frequency source may be an alternator powered mechanically from the secondary energy source of the prime mover or a circuit powered from a battery associated with the prime mover. In operation, the prime mover output shaft rotational rate may vary below, but preferably above and not at electrical synchronous speed, as desired by the user and in relation to the output power required from the generator. Switching and wiring are also adapted to provide for conventional isochronous prime mover operation. A plurality of electrical machines may be ganged to the prime mover output shaft to provide desired gain and output power at the output of the generating system.

18 Claims, 8 Drawing Figures

CONSTANT FREQUENCY VARIABLE RPM GENERATOR

RELATED APPLICATION

This application is a continuation-in-part of U.S. patent application Ser. No. 819,853, filed Aug. 18, 1977, for a "SYNCROGEN", which is now abandoned.

BACKGROUND OF THE INVENTION

1. Field

This invention relates to electrical power generating systems and in particular alternating current electrical power generating systems. More specifically, this invention provides an electrical power generating system including regulating apparatus in which the output power frequency is fixed and is independent of the prime mover output shaft rotational rate,

2. State of the Art

As is known, it is highly desirable to maintain the frequency of the output of an alternating current electrical power generator stable and fixed. In the United States, 60 hertz (hz) is the typical design frequency for rotating electrical machinery as well as for the output of alternating current electrical generators supplying that machinery. It is desirable, if not necessary, to maintain the frequency of any electrical system including a 60 hz system as stable as possible because of impedance losses and other losses which arise in electrical motors and the like if and when the supply frequency varies.

In practice, generators today require a fixed rotational rate output from a prime mover. The prime movers may be either internal combustion engines, such as gasoline engines, diesel engines or gas turbines. Prime movers may also be steam driven turbines. Typically, the prime movers are operated at a fixed rotational rate so that the rotational rate of the output shaft driving the generator system is a given. The fixed output (e.g., 1800 rpm, 3600 rpm) is a design factor identified and related to the number of poles which in turn are preselected to generate a 60 hz output from the generator.

Given the variable load requirements of a generator, it may be stated that the prime mover (e.g., diesel engine) will operate on occasion, if not frequently, inefficiently as to power output and fuel consumption. That is, the engine will be required to operate at a fixed rotation rate to deliver output power which could be more efficiently delivered at a different and probably lower rpm for low system loads and at a higher rpm for high and peak system loads.

Operating a prime mover, be it a diesel engine, turbine or whatever. at a fixed output rotational rate can be deemed inconsistent with the mechanical operating characteristics of the prime mover. For example, fixed rotation rate operation does not maximize the efficiency associated with operation along or over the range of a power torque versus rpm curve for the prime mover. That is, the efficiency of a engine varies over its range of operating rotational rates. For example, a gasoline internal combustion engine may be regarded as having a mechanical efficiency which varies from a low rpm to a high rpm. In particular, the mechanical efficiency diminishes at the higher rpms. Thus, when operating the generator system using an internal combustion engine, it would be preferred for a low power output requirement to operate the engine at a low rpm to make maximum benefit of the higher mechanical efficiencies. See, for example, Mark's Mechanical Engineer's Handbook, Sixth Edition, MacGraw Hill, 1964, page 9-109, page 4-54, page 9-149, et. seq. Operating prime movers at a fixed rmp also results in additional wear and tear on the prime mover when such may not be necessary based on the power/load requirements of the prime mover/generating system. For example, in order to produce a 60 hz output, it may be necessary to operate a diesel engine or gasoline engine at 1800 rpm or 3600 rpm for power loads which may equate only to about 10% of the available power. Operating the engine at an rpm far above that necessary to produce the desired power simply and practically results in unnecessary wear and tear on the engine. In turn, breakdown and/or repair may be more frequent. The cost associated with breakdowns and with the tear and wear is an additional cost relating to the overall cost efficiency of operating a prime mover at a fixed shaft output rotational rate.

Operating prime movers at a designed or fixed rotational rate has in combination with variable electrical loads produced a series of complex problems associated with load variances. Speed regulation equipment associated with, for example a turbine, has a certain definitive response time associated with significant load variances. See, "Marks' Mechanical Engineers' Handbook", Sixth Edition, MacGraw Hill Co., 1964, pages 9-224 through 9-226. Upon the sudden increase or decrease of load associated with the generating system, the prime mover will either slow or increase in speed because of the load variance. The response time is the time within which the governor reacts to bring the turbine or other prime mover back to the design rotational rate. During this period, the frequency of the output power proportionally varies with the rotational rate while the prime mover reacts to come back to the design rotational rate. The variance in frequency has a distinct impact which can in some circumstances be quite costly. The impedance characteristic of the load (e.g., electrical motors) change with the frequency. In situations where increased load is suddenly applied to the generating system, the impedance may change such that motors which are part of the variable output load may suffer impedance related losses to the point that mechanical damage may be imparted to that particular motor. From the other point of view, sudden decreases in load resulting in increases in frequency may have adverse mechanical results with respect to increased speed. The load powered by the generating system may suffer mechanical damage and/or unwarranted wear and tear. Also, variances in frequency may have less than desirable results for electrical equipment which is designed to operate at a set frequency to perform such functions as timing related to frequency. In short, it is desirable, but has been previously unobtainable, to develop a generating system which operates at a fixed output frequency irrespective of a variable load requirement and in which the rotational rate or shaft rate of the pri. e mover is allowed to vary over a wide range to take advantage of cost/efficiency operating characteristics of the prime mover.

A variety of different efforts have been made to devise means resulting in frequency independence or frequency stability in generator operation. For example, U.S. Pat. No. 2,854,617 (Johnson) describes a brush-type frequency control device to provide a stable frequency generator output. The device operates on a heterodyne principle requiring reference frequency feedback from a tachometer which is connected to the prime mover shaft. The tachometer output is combined with a frequency generator output to generate beat frequency signals. The beat frequency signal is supplied through a phase shifting network and mixer to the generator or alternator to maintain the output frequency at a designed or preselected frequency. That is, the system so disclosed does not allow for a freely variable shaft rotational rate. Furthermore, it does not operate independent of the prime mover generator system, and has a finite and calculable response time during load varying conditions. To the extent that the mixer does not remove undesired sum or reference signals, the device will not produce power within the 5% wave shape deviation which is generally or typically the maximum acceptable deviation in the industry. Further, the gain of the overall machine may be severely limited by the electronic components of the mixer.

U.S. Pat. No. 3,070,740 (Chirgwin, et al) discloses a brush type machine in which excitation frequencies change and regulating circuitry causes the field of a generator to rotate continuously at a synchronous speed regardless of shaft speed. Thus, frequency variances were to be eliminated when shaft speed varied with the application or removal of substantial output loads to or from the output of the generator. Chirgwin et al teaches a frequency comparison scheme between a reference and the rotation rate in a pulse generator. Chirgwin et al, although ostensibly providing an output independent of shaft rotational rate, discloses a control method for a system having a designed isochronous prime mover and generator.

U.S. Pat. No. 3,183,431 (Ford) simiarly is an effort to provide a regulating system to control both the frequency and the voltage of the output of the generator by supplying variable frequencies to the poly phase rotor of the generating system to accommodate variances in shaft speed during operation.

Machines heretofore known, including those disclosed by Johnson, Ford and Chirgwin et al, use regulating schemes typically directed toward reducing or minimizing the lag time or response time to return the output frequency of the generating system to a design level in the presence of a sudden load change which causes prime mover output RPM to change. The schemes of Johnson, Ford and Chirgwin et al basically provide variable excitation by developing error signals having finite response times to regulate output frequency when used with a substantially isochronous prime mover output. Machines heretofore known, including the machines of Johnson, Ford and Chirgwin et al, do not provide for the optimization of prime mover operation while generating a stable output frequency.

Machines manufactured for the United States market have historically been designed to generate alternating current at a 60 hz frequency. Machines made in the United States for other parts of the world must be designed, redesigned or otherwise modified to generate output frequencies at the frequencies found throughout the world which include, for example, 55 and 25 hertz. Because of the different system frequencies used by various countries and industries throughout the world, machines designed for fixed 60 hz operation in the United States must be modified to operate with a different prime mover rotation rate to generate the frequencies required in the country or for the industry in which the machines are to be used. The result of such modifications is that the prime mover must operate at a speed other than designed speed resulting in a potentially significant loss of efficiency. In many cases, a machine may suffer significant power derating which in turn increases the capital cost per kilovolt-ampere or kilowatt hour.

There is a need for a generating system with a prime mover which may operate over a wide range of speeds during normal operation while at the same time generating an output at any number of preselected designed constant frequencies. Inherent savings in materials, repair time and the like may be obtained from such a machine or generating system.

SUMMARY OF THE INVENTION

An electrical power generating system includes a prime mover which supplies rotational torque through an output shaft at variable rotational rates other than electrical synchronous speed. A first electrical machine with a preselected number of poles has a rotor and a stator. The rotor is connected to be rotated by the prime mover shaft. A second shaft is connected to be rotated by the prime mover output shaft at a rotational rate proportional to the rotational rate of the prime mover output shaft. A second electrical machine with a preselected number of poles has a rotor and a stator. A frequency source is connected to receive energy from a secondary source associated with the prime mover. The frequency source supplies an output signal to the stator of the first machine to generate a magnetic field therein which rotates directionally relative to the direction of rotation of the prime mover shaft to generate an output from the first machine rotor at a preselected frequency.

The output of the rotor of the first machine is connected to the input of the second machine to generate a field therein which rotates directionally relative to the direction of rotation of the shaft to generate an output from the second machine stator at a preselected frequency proportional to the frequency source output frequency. A voltage sensor senses the output voltage from the stator of the second machine and supplies a signal reflective thereto to the frequency source. The frequency source output signal is at a fixed frequency and of a magnitude to maintain the voltage of the second stator output at a preselected designed magnitude. The prime mover shaft may rotate at variable rates of rotation other than at electrical synchronous speed as desired by the user while the frequency of the electrical power output of the system is proportional to the frequency of the electrical output signal of the frequency source independent of the prime mover output shaft rotational speed.

In one embodiment, the frequency source is an electrical machine having a rotor conductively connected to receive as an input the output of the voltage sensor to act as the field signal of the machine. The machine also has drive means connected to the rotor and to the secondary energy source of the prime mover to receive torque therefrom and to rotate the rotor at a substantially fixed preselected rate. The stator of the machine has an output which is connected to the stator of the first machine to supply thereto the frequency source output signal.

In a preferred embodiment, the frequency source has a frequency determinator circuit which is conductively connected to receive the output of the voltage sensor. It has another input to receive power from a source of direct current power associated with the prime mover which is acting as the secondary source of energy. The frequency determinator supplies at its output a signal at a preselected frequency at variable power levels related to the magnitude of the system output voltage to maintain the system output voltage at a preselected magnitude. The frequency source also includes amplifier means to amplify the frequency determinator output and supply the amplified signal to the stator of the first machine. The frequency source may supply a multiphase output signal.

The generating system may include alternate operation means which include a switch device which is interconnected between the output from the frequency source and the stator input of the first machine. The switch has a normal position which conductively connects the output from the frequency source with the first machine stator input. The switch also has an alternate position which conductively disconnects the frequency source output from the first machine stator. An alternate field supply also is included within the alternate operation means. The alternate field signal supply includes a source of direct current which is supplied to the first machine stator through second switch means. The second switch means has a normal nonconductive position and an alternate conductive position to supply a field signal to the stator of the first machine through conductors connected to a second input. The alternate operation means may also include cross connect means electrically or mechanically in circuit between the output of the first rotor and the input to the second machine rotor to switch the direction of rotation of the magnetic field generated in the second machine for conventional operation as necessary.

The instant invention may also include at least one ganging pair of electrical machines mechanically and electrically connected in subsequent sequence to the second electrical machine. Each ganging pair of machines includes a first ganging shaft connected to be rotated by the prime mover output shaft at a rotational rate proportional to the rotational rate of the prime mover output shaft. A first ganging machine has a rotor and a stator. The rotor is connected to the first ganging shaft for rotation thereby. The rotor has an electrical output connected to the rotor of a second ganging machine. The stator of the first ganging machine is connected to receive power from the stator of the second electrical machine. The field of the first ganging machine rotates directionally relative to the direction of rotation of the shaft of the prime mover output to generate a preselected output frequency; and the magnetic field rotational direction in the second ganging machine is rotated directionally relative to the direction of rotation of the prime mover output shaft to generate an output at a preselected frequency proportional to the output frequency of the frequency source.

BRIEF DESCRIPTION OF THE DRAWINGS

In the drawings, which illustrate what is presently regarded as the best mode for carrying out the invention.

DESCRIPTION OF THE ILLUSTRATED EMBODIMENT

Figure 1:
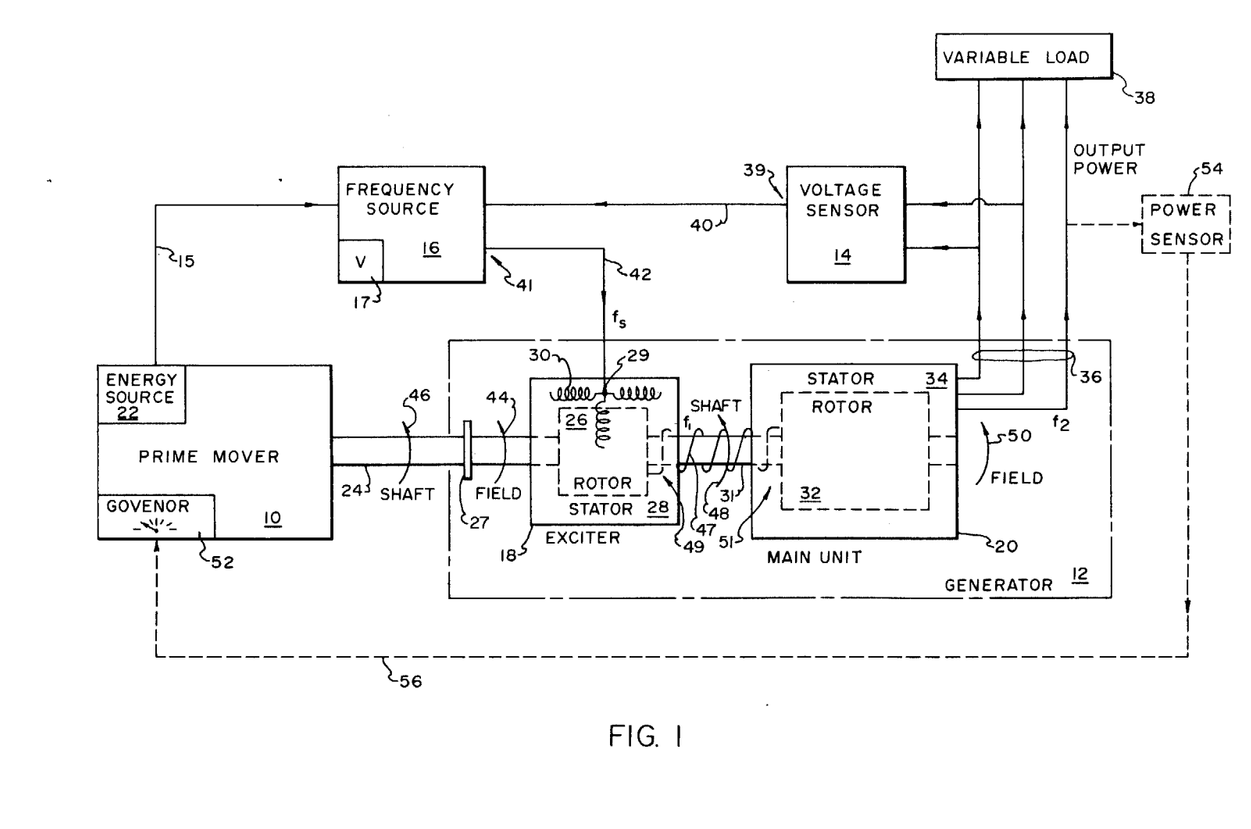
FIG. 1 is a block diagram of a generating system of the instant invention.

FIG. 1 depicts the generating system of the instant invention in simplified block diagram format. The generating system depicted includes a prime mover 10, a generator 12, a voltage sensor 14 and a frequency source 16. The generator is depicted to be comprised of an exciter 18 and a main unit 20.

The prime mover 10 here depicted may be any one of a variety of different kinds of machines used to power electrical generators. Such machines may include gasoline powered internal combustion engines, diesel engines, gas turbines, steam turbines, or other machines which may be devised or known to provide usable energy in the form of rotational torque or shaft horse power to power or drive an electrical generator. Typical machines of the type which may be used to power smaller type electrical generators include a VM diesel 1306V and TI-1308V and a V1310. Similar engines of various sizes and horse power designs may be obtained for powering diesel generators including the model 5025 General Motors diesel. The prime mover 10 of the type to be used in this particular generating system has associated therewith a secondary energy source 22 which may be either means to extract mechanical energy from the prime mover, a battery or an alternator associated with the prime mover. The prime mover main power output is delivered through an output shaft 24 connected to deliver rotational torque or shaft horse power. The shaft 24 is connected to the rotor 26 of the generator exciter 18 by means 27 to rotate the rotor within the exciter stator 28. The means 27, here shown, is a flange. However, other means including gearing may be used to mechanically connect the output shaft 24 to the rotor for rotation thereby. The exciter 18 may be regarded as a first electrical machine. The stator 28 thereof has an input 29 connected to receive a field signal and supply into its windings symbolically shown as 30 to generate a magnetic field therewithin. The rotor 26 has an output which is connected to supply output power therefrom as more fully discussed hereinafter.

A second shaft 31 which may be regarded as a continuation of the prime mover output shaft 24 or may be regarded as an independent shaft connected to be powered and rotated preferably in the same mechanical direction and at a rate proportional to the rotational rate of the output shaft 24 is here depicted to interconnect the exciter 18 to the main unit or second electrical machine 20. The rotation rate of the second shaft 31, in this embodiment, is directly proportional at the proportion of 1:1 to the rate of the output shaft 24. Those skilled in the art will recognize that gearing may be used to drive the second shaft 31 directly from the output shaft 24 or otherwise used to mechanically interconnect the first machine rotor 26 to the second shaft 31. The gearing can be selected to provide other proportional rotation rates.

The shaft 31 axially interconnects the rotor 26 of the first machine 18 to the rotor 32 of the second machine 20 to rotate the rotor 32 of the second machine within its stator 34. The stator 34 has an output 36 which is connected to be the system output. The system output 36, here depicted, is a three phase electrical power output connected to a load or electrical system which may be regarded as a variable load 38.

The voltage sensor 14 is connected to the system output 36 to sense the voltage thereof and to generate a signal at its output 39 and supply it via conductor 40 to the frequency source 16. The voltage sensor 14 may be any one of a variety of circuits or devices to sense electrical voltage and in fact may be a common voltage regulator, as desired by the user. The prime characteristic of the voltage sensor 14 is to supply a voltage signal reflective of the system output power to be processed to cause the voltage of the output 36 to remain in essentially constant or fixed condition. In the instant embodiment, the voltage sensor 14 detects variances in the voltage of the output 36. If the voltage decreases (e.g., upon increase in the magnitude of the load 38), the sensor output 39 signal increases proportionally. Thus, the signal processed through the frequency source 16 is of greater magnitude and in turn the field signal supplied to the first machine or exciter stator 28 is of greater magnitude. The output from the exciter rotor 26 is thus greater and the voltage from the main unit 20 increases to the desired magnitude. If the voltage at the output 36 increases, the sensor output 39 decreases so that in turn the output voltage will decrease to the desired magnitude.

The frequency source 16, as here shown, receives energy from the secondary energy source 22 via means 15 which may be mechanical means or electrical means as here depicted. The energy supplied may be mechanical or electrical based on the type of frequency source 16 selected by the user for a particular application. The secondary energy source 22 is here shown associated with the prime mover 10. Those skilled in the art will recognize that other source of energy external to the system can be used.

The frequency source 16 generates an output signal at a preselected frequency or at a frequency which is set by operation of varying means 17 associated with the frequency source 16. The frequency source 16 also receives the voltage sensor output via conductor 40. The output 41 of the frequency source reflects the voltage sensor output in that the magnitude of the output signal of the frequency source is varied by the voltage sensor output as necessary to adjust the output power voltage to a preselected magnitude or a predesigned magnitude (e.g., 480 volts ac). The frequency source 16 may be a variety of different circuits which generate a particular fixed frequency output (e.g., 50 hertz, 60 hertz) independent of prime mover operation or rotational speed and independent of the output power of the generating system here depicted. The frequency source output 41 is conductively connected by conductor means 42 to the stator 28 of the first electrical machine or exciter 18. The frequency source output 41 generates a magnetic field within the exciter 18 which rotates in relation to the direction of rotation of the output power shaft 24 of the prime mover and the rotor 26 to generate an output from the exciter of a preselected frequency.

To determine the output frequency from the exciter 18, one must take into account various design factors which are selected by the user based on desired machine/system characteristics in relation to use and desired output. Such factors include, for example, the number of poles of the exciter 18, the number of poles of the main unit 20, the system output frequency, magnetic cross-sectional areas, cooling/heating characteristics, and other factors or characteristics known to those skilled in the art. Characteristic selection is constrained or regulated by the following two relationships:

$$f_1 = \frac{N_1 \times (S_1 \pm f_s)}{2} \quad (1)$$

Where $f_1$ is the frequency in hertz of the output from the exciter or first machine 18, where $N_1$ is the number of electrical poles of the exciter 18, where $S_1$ is the shaft 24 rotation rate in revolutions per second, and where $f_s$ is the frequency in hertz of the output from the frequency source 16; and $$f_2 = \frac{N_2 \times (S_2 \pm f_1)}{2} \quad (2)$$

Where $f_2$ is the frequency in hertz of the system output, where $N_2$ is the number of electrical poles of the main unit 20, where $S_2$ is the shaft 31 rotation rate in revolutions per second and where $f_1$ is the quantity identified in equation (1) above.

Using certain characteristics it can be seen that the output frequency ($f_2$) is independent of shaft rotation rate and directly proportional to the frequency ($f_s$) of the frequency source output 41. If the exciter 18 and main unit 20 are each two pole machines, and if $f_s$ is set at 60 hz, it can be seen, by solving equations (1) and (2), that for any shaft rotation rate ($S_1$ and $S_2$) above 60 revolutions per second (rps) or below 60 rps, the output frequency $f_2$ will always be 60 hz. At shaft speeds $S_1$ and $S_2$ above 60 hz (assuming $S_2$ rotates at the same rate as $S_2$; i.e., proportional rotation of 1:1), the exciter 18 operates as a generator; and the main unit 20 operates as a generator. Thus, the gain from the system is about 20 per machine or higher. In such a case, the field in the exciter 18 rotates in the same direction 44 as the shaft 46 (FIG. 1). The shaft 24 rotates faster so that the net rotation for electrical frequency determination is found by subtracting the field frequency ($f_s$) from the shaft rate S in rps. The shaft 31 is connected in this embodiment to rotate directionally in the same direction as shaft 24. Those skilled in the art will recognize that the shaft 31 could be connected by gearing (not shown) to rotate opposite or counter to shaft 24 rotation 46. The field signal supplied to the main unit 20 via conductor 47 is connected to rotate, in this example, in the same direction as the shaft 31 rotation 48. Shaft 31 is rotated faster than the field so that the net rotation for electrical frequency determination is found by subtracting the field frequency ($f_1$) from the shaft rate ($S_2$).

If the shaft 24 is rotated, in this case at a rate $S_1$ less than $f_s$ (60 hz), those skilled in the art will recognize that the exciter 18 would be motorized. The output frequency ($f_2$) would nonetheless remain proportional to $f_2$ and independent of shaft rate $S_1$ and $S_2$. The gain of the exciter 18 and the generating system would, however, be reduced. Other pole ($N_1$ and $N_2$) and frequency source output ($f_s$) selections may at certain shaft rates ($S_1$, $S_2$), result in motorizing of either the exciter 18 or main unit 20. It may be noted also that when the exciter 18 is motorized, the field signal into the main unit 20 is reversed in rotational direction so that it rotates counter to shaft 31 rotation 48. Motorization may be desirable in some applications, for example, in some cases it may be desirable for a breaking effect to be extant.

In some circumstances, it may be desirable to rotate the field of the exciter 18 counter to shaft 24 rotation 46. In the two pole ($N_1$ and $N_2$) example discussed above, it can be seen that at shaft speeds ($S_1$ and $S_2$) above or below 60 rps ($f_s$ at 60 hz) the exciter 18 is generative; and the main unit is motorized. However, the output frequency ($f_2$) is fixed and proportional to the frequency source output $f_s$ totally independent of shaft rotation rate ($S_1$ and $S_2$).

In another similar example, the frequency source output ($f_s$) is set at 30 hz. $N_1$ is selected to be two poles; and $N_2$ is selected at four poles. In such a system, the output frequency will be 60 hz and totally independent of shaft rotation rate $S_1$ and $S_2$. The same result is obtained with $f_s$ at 15 hertz, $N_1$ at two poles and $N_2$ at eight poles.

From the above examples, it can be seen that the frequencies in the machine chain can be calculated and a condition of critical speed demonstrated where the system output voltage and frequency goes to zero. Systems herein described cannot be operated with the shafts 24 and 31 rotating at critical speed. The critical speed is, in effect, electrical synchronous speed for the generating system if conventionally rotated/operated. From the equations (1) and (2), rotation at a critical speed would result in a zero volt zero frequency output from the exciter 18 and/or main unit 20. In operation, the preferred system is preferably operated above the critical or synchronous speed. In construction, the user preferably selects electrical machines having numbers of electrical poles to place the critical speed below the minimum desired prime mover RPM. However, it may be operated below critical speed if desired by the user.

The rotor 26 of the exciter 18 has an output 49 which is conductively connected by conductors 47 to the input 51, rotor 32 of the second machine 20. The conductor 47 is here shown to be wrapped about the shaft 31 to illustrate a brushless arrangement by which the output of the rotor 26 is directly connected along the shaft 31 to the main unit rotor 32. In some assemblies, brush means may be required. However, those skilled in the art will recognize that it is desirable to eliminate the use of brushes to reduce construction costs and subsequent maintenance costs. The output 49 of the exciter 18 is supplied from the rotor 26 thereof through the conductor 47 to the rotor 32 of the main unit 20 to generate a magnetic field therein to rotate directionally relative to the direction of rotation of the shaft 31 to generate a preselected frequency output as hereinbefore discussed.

It may be noted that the exciter 18 is shown in FIG. 1 substantially out of proportion with respect to the size of the main unit. Exciters are typically fairly small units mounted about a prime mover output shaft to supply excitation to a main unit. The exciter 18, as here shown, is constructed with a polyphase wound stator and preferably with a rotor wound to have distributed single phase windings having no common current carried in adjacent slots. The main unit 20 is constructed to have slotted laminations of silicon steel, potted steel or other serviceable magnetic material and assembled to form a rotor cylinder of magnetically independent segments in which are embedded windings similar to those of the exciter rotor to receive an excitation input from the exciter 18. Polyphase windings are typically used in the exciter stator and main unit stator. The particular number of phase windings is selected by user based on the load characteristics. Single phase rotor windings may be utilized to produce a polyphase generator output providing a single phase rotor windings are arranged on the rotor of the main unit 20 to produce a rotating magnetic field not fixed to shaft rotation rate. Magnetic materials utilized for construction of the main unit 20, as well as the exciter 18, must comply with hysteresis considerations.

The exciter rotor 26 is wound similar to that of the generator rotor or main unit rotor 32. Coil leads are connected to the main generator rotor 32 directly by the conductors 47 so as to provide current and magnetism to generate the electricity in the main unit 20. The exciter stator 28 is also a polyphase wound machine with stator poles of a number to be equivalent to the rotor winding pole scheme. The exciter stator input 29 is usually phased to provide a magnetic rotational direction in the same direction as the shaft 24 rotation direction 46.

It may be noted that the prime mover 10 also has associated therewith a governor apparatus 52. The governor apparatus may be any one of a variety of different mechanical or electrical or electromechanical governors to provide adjustable optimum operation. Such a governor may be monitored continuously by an operator or monitored periodically, as desired. For example, if a generator is to be operated to power a relatively fixed load such as a series of operating irrigation pumps, then the governor can be set to operate the prime mover (for example, diesel engine) at a rotation rate best suited to obtain maximum efficiency and fuel economy. In some circumstances, it may be desirable to use a governor that is adjustable so that the speed of operation can be varied by the operator/user based on observed or expected electrical loads. In all cases, the operator is in a position to vary the speed of the prime mover and in turn the rotational rate of the prime mover output shaft 24 as desired to obtain the greatest fuel economy and efficiency of operation for the load demand then required. In select circumstances, it may be desirable to connect the power sensor 54 which may be a watt meter or similar device to the output 36 of the generator 12. The power sensor 54 senses the power output (kilovolt-amps or watts) and supplies a signal proportional or reflective thereof to the governor by conductor 56, or other means, to vary the governor speed setting to optimize response, fuel consumption or service life of the prime mover.

It may be noted also that the frequency source 16 is provided with variable means 17 to vary the frequency output of the frequency source. The varying means 17, as more fully illustrated and discussed hereinafter, may be used to adjust the frequency so that the unit power output and the generating system itself does not suffer a derating when operating at frequencies other than the conventional U.S. output frequency of 60 hz. That is, the varying means 17 may be used to adjust the frequency source output 41 so that the generating system may generate power and power line frequencies of 25 hz, 50 hz or 60 hz, as desired by the user. Thus, the machine and the system herein described is truly compatible to existing international systems with concomitant production cost savings and engineering costs savings in manufacture.

It may also be noted that the system herein described does not require the use of main power shaft gear boxes. That is, prime mover speed may be designed and selected for a particular range of operation concomitant with most efficient system operation without the need to include a gear box or reduction gear as necessary to provide a specific preselected rotation rate to the generator 12 in the torque or power transmission train associated with the output torque delivered by the prime mover. The cost savings may be as high as 20% per kilowatt or kilovolt-amp with respect to similarly powered and sized conventionally regulated and constructed generating units.

Figure 2:
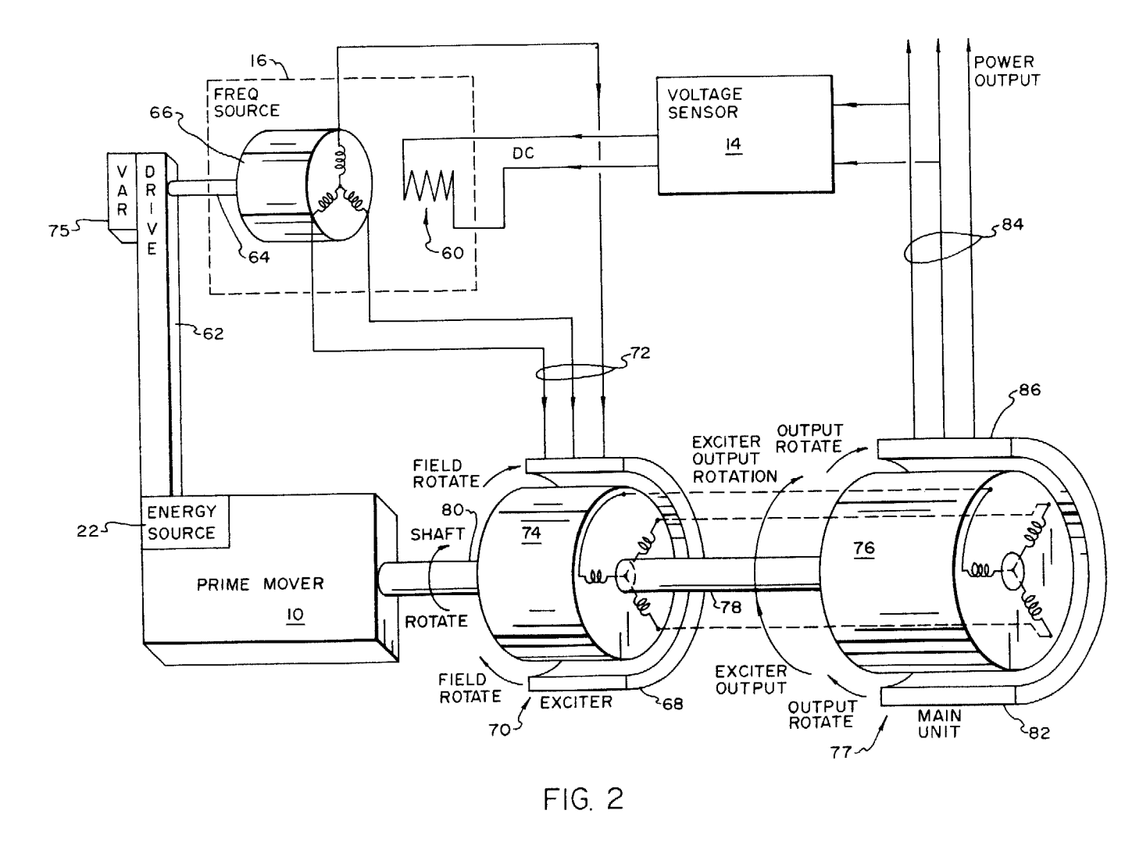
FIG. 2 is a block diagram with partial cut-aways and perspective views of components of a generating system of the instant invention.

Referring now to FIG. 2, a frequency source 16 is symbolically illustrated as an alternator or third electrical machine. The alternator has a field winding 60 which is supplied by the voltage sensor 14. The alternator or frequency source 16 also has a rotor 66 which is driven from a secondary energy source 22 of the prime mover by drive means 62 connected by a shaft 64 to the rotor 66. The rotor 66, as here shown, supplies an alternating current output to the stator 68 of the exciter 70 via conductor 72. Other alternators having rotating fields may be used if desired. The frequency output of the frequency source is determined by the following relationship:

$$fs = (N_3 \times S_3)/2$$

Where fs equals the frequency of the output, $N_3$ equals the number of poles of the machine, and $S_3$ is the rotation rate in revolutions per second of the rotor 66.

For the frequency source 16, here shown in FIG. 2, the rotation rate of the rotor by the shaft 64 is varied by variable drive means 75. The variable drive means 75 may be a belt drive means associated with an adjustable pulley, such as the one illustrated in FIG. 8. Other variable drive means may be used to produce a fixed rotation rate for the shaft 64 independent of prime mover operation or rotation rate. Those skilled in the art will recognize that a variety of different devices can be used for such purposes. The adjustable pulley of FIG. 8 with respect to the variable drive illustrates that the rotation rate of the rotor 66, and in turn the frequency of the output of the frequency source 16, can be varied based on the intended application as desired by the user. Alternately, the secondary energy source 22 of the prime mover 10 may include a mechanical drive device to operate at a fixed rpm independent of shaft rpm or prime mover operation.

It may be noted that the frequency source shown in FIG. 2 can readily be constructed by modifing a conventional alternator presently widely used with automobile engines. The field can be modified to receive a direct current input from the voltage sensor 14; and the output can be modified to provide the multiphase signal to the exciter stator 68, as shown. The frequency source output is supplied via conductors 72 to generate a magnetic field in the exciter 70 which will rotate relative to the direction of shaft rotation as hereinbefore discussed. The output of the rotor 74 of the exciter is supplied directly to the rotor 76 of the main unit 77 to generate therein a magnetic field which rotates directionally relative to the direction of rotation of the shafts 78 and 80 when the units are connected as shown. The power from the main unit 82 is supplied as the system output 36 (FIG. 1) to the external load via conductors 84 from the stator 86.

Figure 3:
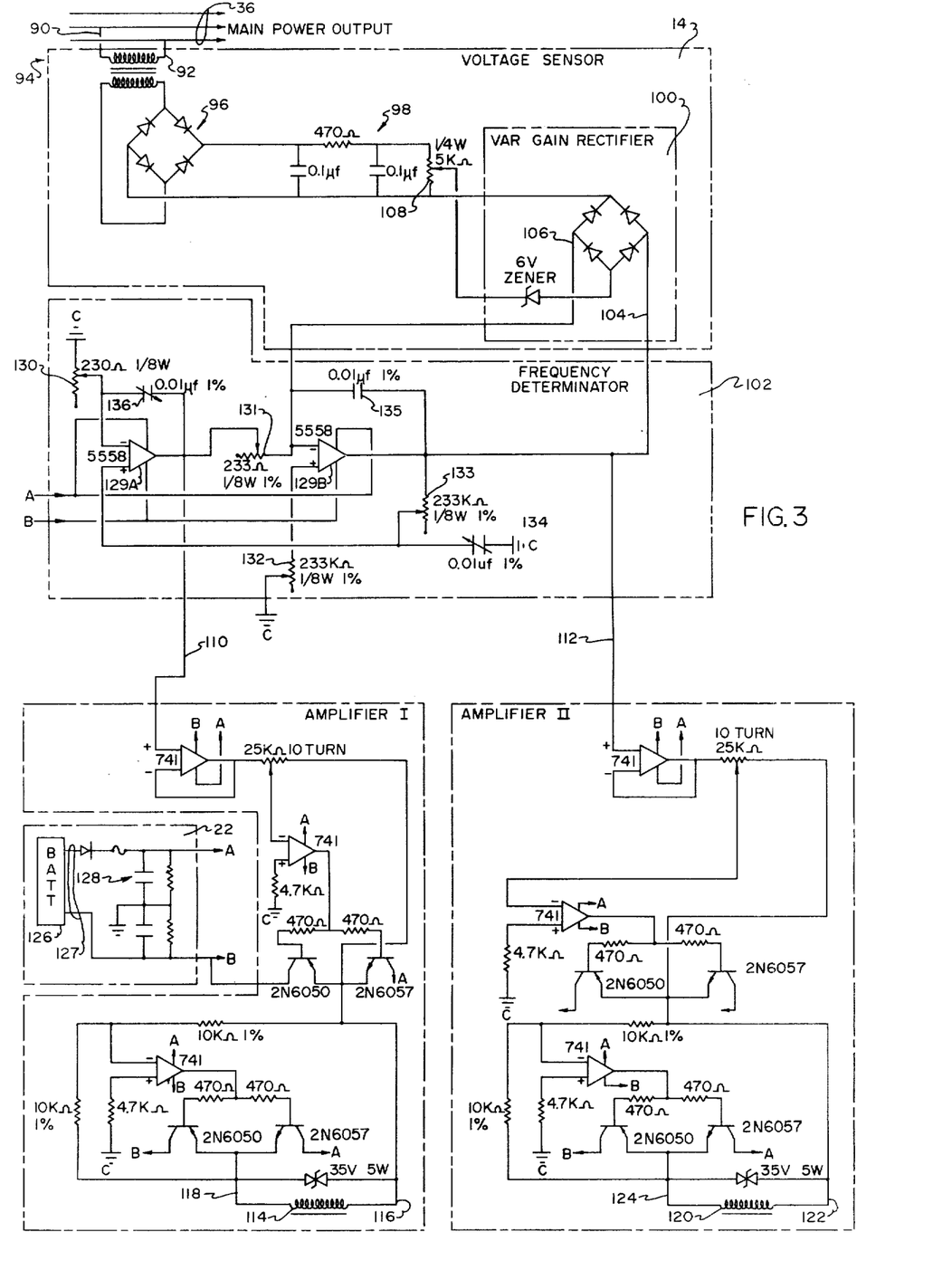
FIG. 3 is a circuit diagram of regulating components for use with the generating system of the instant invention.

Referring now to FIG. 3, a frequency source 16 is illustrated in combination with a voltage sensor 14 and with a secondary energy source 22 associated with the prime mover. The voltage sensor 14 receives an input via conductors 90 and 92 from the main power output 36 (FIG. 1) of the system. The input is processed through a transformer 94 and supplied to a rectifier 96. Thereafter the signal is filtered by filter means 98 and supplied to a variable gain rectifier 100. The output of the voltage sensor is supplied to the frequency determinator 102 via conductors 104 and 106. The gain of the voltage sensor 14 may be set by adjusting the adjustable resistor 108.

The frequency determinator 102 may be regarded simply as a solid state polyphase sign wave oscillator used to generate an output signal of a preselected frequency which may be single phase or multi phase as desired for a particular application. The output of the frequency determinator 102 in the illustrated circuit is a two phase output. One phase is supplied via conductor 110 to amplifier I; and the second phase is supplied to amplifier II via conductor 112. Amplifier I and amplifier II are each variable gain amplifiers whose gain is controlled by the voltage sensor 14 through the frequency determinator 102 output conductors 110 and 112. Amplifier I and amplifier II each receive the frequency determinator output, amplify it and supply the amplified frequency signal to the stator windings of the first machine or exciter 18 (FIG. 1). Amplifier I supplies its output to the winding, herein symbolically illustrated as a coil 114, via conductors 116 and 118. Amplifier II supplies its output to another stator 28 winding, herein symbolically represented by the coil 120, via conductors 122 and 124. It can be seen that a two phase multi phase output is supplied to the stator 28 of the exciter 18. Those skilled in the art will recognize that the frequency determinator 102 can be modified to provide a third phase output to another amplifier to provide a three phase output or any multiphase output desired for a particular application. Similarly, a single phase output can also be supplied. The frequency determinator 102 and the amplifier I and amplifier II receive control power from the secondary energy source 22 which is here illustrated to be the battery 126 which would be typically associated with a diesel engine. That is, diesel engines or gasoline engines have starting batteries which can be used to supply the control power to the circuit, herein illustrated in FIG. 3, independent of prime mover operation. In some circumstances, a small alternator may be associated with the prime movers such as a diesel or gasoline engine. A supply of dc power, comparable to that supplied by the battery 126 can be obtained therefrom through a rectifier. The battery output 127 is filtered by the filter network 128 to supply a stable output at a fixed preselected control voltage which may be 20 or 40 volts or any other control voltage that is desired by the user which is here illustrated to be the voltage represented by the letters A and B. In the illustration of FIG. 3, connections are represented by the letters A and B and appropriate arrows to indicate where power is supplied to the various components in the frequency determinator 102 and in the amplifier I and amplifier II.

As here illustrated, the frequency determinator 102 together with amplifier I and II comprise a frequency source 16 which can be varied by simply adjusting the frequency determinator components which bias the oscillators 129A and 129B, as necessary to supply a frequency other than the 60 hertz frequency which is presently preset by the components herein illustrated. The adjustable components are resistors 130, 131, 132 and 133 and capacitors 134, 135 and 136. The adjustable components together constitute the varying means 17 of the frequency source 16. In illustrating the frequency determinator 102, as well as amplifiers I and II, the letter 'C' is associated with ground symbols to denote circuit common or circuit ground which is different from the negative lead from any source of direct current.

Figure 4:
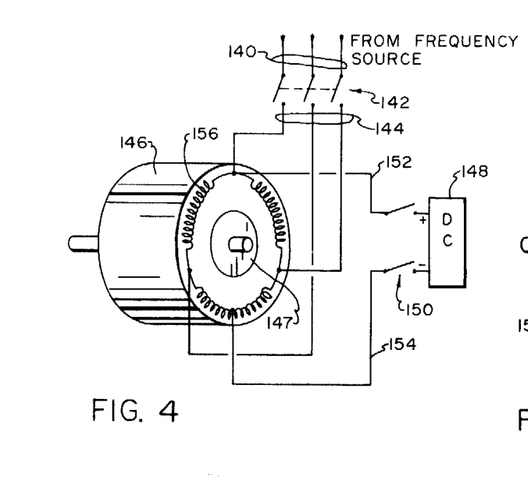
FIG. 4 is a partial perspective view of some components of a generating system with alternate operation means.
Figures 5, 6, 8:
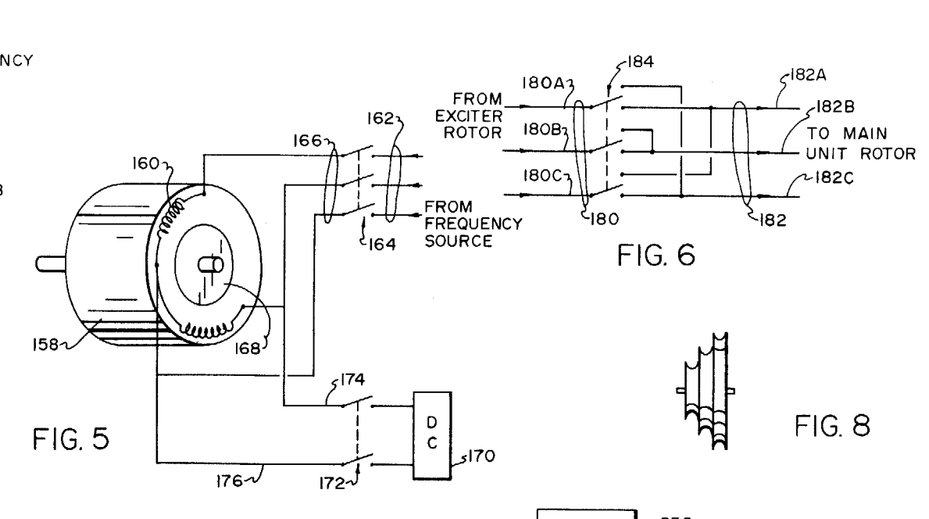
FIG. 5 is a partial perspective view of some components of a generating system of the instant invention with alternate operation means.
FIG. 6 illustrates cross connect means for use with a generating system of FIGS. 4 and 5.
FIG. 8 is a front view of variable drive means.

FIGS. 4, 5, and 6 illustrate alternate operation means for use with the frequency generating system of the instant invention. FIG. 4 shows an input signal being supplied via conductors 140 from a frequency source 16 through switch means 142 and conductors 144 to the stator 146 of a first machine or exciter, such as the exciter 18 illustrated in FIG. 1. The stator 146 has a rotor 147 therewithin which has an output connected comparable to the rotor 26 shown in FIG. 1. The output and other system component are not here illustrated for purposes of simplicity. Direct current power is available from the source 148 and is supplied through second switch means 150 via conductors 152 and 154 to the stator windings 156, as shown. Upon operation of the second switch means 150 from its normal open position (shown) to a closed or alternate position, dc power will be supplied to generate a magnetic field having a north and south pole within the exciter so that power may be generated upon rotation of the rotor 147 for further supply to a main power unit such as the main unit 20 of the generator 12 shown in FIG. 1. At the same time the dc power is being supplied, as above discussed, the power from the frequency source is interrupted by operating switch means 142 to an open (shown) or nonconductive condition so that a signal from the frequency source 16 is not applied to the stator windings 156.

FIG. 4 illustrates a three phase stator. FIG. 5 illustrates a two phase stator 158 having a two phase windings 160. The two phase stator 158 receives a multiphase input via conductors 162, switch means 164 and conductors 166 to act as a magnetic field signal for the first electrical machine the stator of which is illustrated as 158 and the rotor of which is illustrated as 168. Direct current power from the source 170 is supplied via switch means 172 and conductors 174 and 176 to create the north and south poles of a magnetic field within the first machine or exciter.

The output from the rotors 147 and 168 of FIGS. 4 and 5 is supplied to the main unit motor via conductors 180 and 182 through switch means 184 (FIG. 6). The switch means 184 is operable between a normal and an alternate position. In the normal position the output of the rotors 147 and 168 is supplied directly through to the main rotor. That is, conductor 188 is connected directly to conductor to 182a and conductors 180b and 180c are respectively connected to 182b and 182c. In the alternate position, which is the position illustrated in FIG. 6, the multiphase output of the exciter rotors 147 and 148 is crossconnected so that the direction of rotation of the magnetic field in the main unit is reversed from that hereinbefore discussed. Depending on the design characteristics of the generating system, those skilled in the art will recognize crossconnect means may or may not be required to operate in the alternate mode.

Placing the switch means 184 in the alternate position, as illustrated in FIG. 6, connects conductor 180a with conductor 182c and conductor 180c with conductor 182a. When the switch 142, 150 and 184 are all placed in the alternate positions, the generating unit, such as the type illustrated in FIG. 1, may be regarded as having been converted into a conventional exciter/main unit generator without a fixed frequency source. That is, a magnetic field is imparted to the exciter 18 to generate an output which is in turn supplied as excitation or as the magnetic field of the main unit 20. The main unit stator 34 supplies output power at a frequency directly proportional to the number of poles and to the rotation rate of the shaft in accordance with the relationship:

$$F = (N \times S)/2$$

Where F equals output frequency, N equals the total number of electrical poles in both the exciter and the main power unit, and S equals the shaft rotation rate in revolutions per second which is turning the rotor of the main unit.

In the event of an emergency or in the event of an equipment breakdown, such as a failure of the frequency source, it may be necessary or desirable to operate the generating system of the instant invention in the alternate or conventional mode as hereinabove described to avoid a loss of power.

Figure 7:
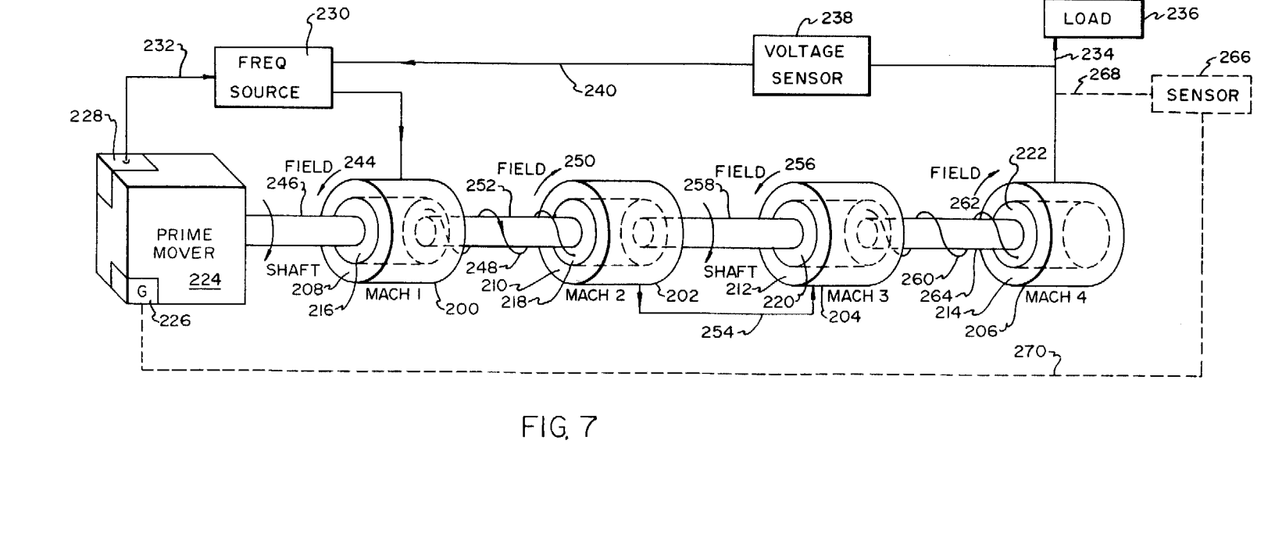
FIG. 7 is a perspective block diagram view of a generating system of the instant invention with ganging machines associated therewith.

FIG. 7 illustrates a ganging arrangement for a generating system of the instant invention. The generating system of the instant invention, as illustrated in FIG. 1, operates at a gain of approximately 20 per machine as opposed to the gain of conventional generating equipment which may be as high as 30, 35 or even 40 per machine. In some applications, it may be necessary to generate a substantially larger output power than otherwise practically available for an exciter main unit configuration. To obtain sufficient electrical gain to generate the necessary or desired electrical power output, ganging may be necessary. As illustrated in FIG. 7, ganging is in effect the placing of a plurality of pairs of electrical machines such as machine I (200) and machine II (202) to act as a first pair and machine III (204) and machine IV (206) to act as a second pair. Additional pairs of machines may be used as desired and as will be recognized by those skilled in the art. As here illustrated, machines I, II, III and IV are each constructed as hereinbefore described in series or sequence to provide the desired gain. Machines I, II, III and IV, respectively, each have stators 208, 210, 212 and 214 and rotors 216, 218, 220 and 222. The prime mover 224 may be any one of the prime movers as hereinbefore discussed and may have governor means 226 and secondary energy source means 228 associated therewith. The secondary energy source 228 supplies energy to a frequency source 230 via conductor 232 which may also be a variable drive means as hereinbefore discussed. The output 234 of the system illustrated in FIG. 7 is supplied to a variable load 236. The output voltage is sensed by voltage sensor 238 which in turn supplies a signal reflective of the output voltage to the frequency source 230 via conductor 240, as more fully discussed with respect to FIGS. 1, 2 and 3. The frequency source 230 operates as the frequency source 16 in FIG. 1 and supplies a frequency amplified signal at a preselected or desired frequency via conductor 242 to the stator 208 of machine I to generate in machine I a magnetic field 244 which rotates relative to the direction of the rotation of the output shaft 246 to generate a preselected frequency. The rotor 216 of machine I supplies its output via conductor means 248 to the rotor 218 of machine II to generate a magnetic field in machine II. The field therein generated rotates relative to the direction as the rotation of the shaft 252 which may be regarded as an extension of the prime mover output shaft 246 or otherwise connected to be rotated directionally and proportionally to the direction of rotation and the rotation rate respectively of the prime mover output shaft 246. An output is supplied from the stator 210 of machine II via conductor 254 to the stator 212 of machine III to generate a magnetic field in machine III which generally rotates directionally 256 relative to the direction of the rotation of the shaft 258 which may also be regarded as an extension of the prime mover shaft 246 or otherwise connected to rotate directionally in the same direction and proportional to the rotation rate of the prime mover output shaft 246. The rotor 220 of machine III supplies its output via conductor 260 to the rotor 222 of machine IV to generate a magnetic field therein which rotates directionally 262 relative to the direction of rotation of the shaft 264 which is connected to rotate comparable to the rotation and the rotation rate of shafts 246, 252 and 258. The stator 214 of machine IV is connected to supply the system output 234 which has an electrical output of a predesigned gain achieved by the ganging as here described to the load 236.

In practice, it may be desirable to connect a power sensor 266, such as a watt-meter, to the output 234 of the ganged system by conductor means 268. The sensor 266 in turn supplies a signal to the governor 226 via conductor 270. The governor includes means to receive the signal which varies in relation to output power to increase prime mover speed in relation to a preferred power out versus speed curve for the particular prime mover. A variety of electro-mechanical controls are available or may be devised to act as such means.

To effect the ganging of the system described in FIG. 7, and generate an output at a particular frequency, the number of poles of each one of the machines must be preselected in accordance with equations like equations (1) and (2) so that the net or resulting frequency of the output signal supplied to the system output 234 is at the desired frequency (e.g., 60 hz, 25 hz, etc.) independent of shaft rotation rate. Table I herein sets forth the poles, rotational direction, and other data of systems such as the one illustrated in FIG. 7 having four machines and having poles and rotational rates of the prime mover shaft as indicated. In Table I the shaft output rpm from the prime mover is indicated in revolutions per minute; and the number of poles refers to the number of electrical poles in the particular machine. The number of electrical poles may be determined by the relationships set forth in Table I. With respect to the output, the output is generated from either the rotor (R) or the stator (S) and rotates directionally either clockwise (CW) or counterclockwise (CCW) when viewed from the prime mover 224 looking toward machine IV down the prime mover output shaft 246. The frequencies indicated are in hertz or cycles per second. The ganging arrangement illustrated in FIG. 7 preferably is used for multiphase operation and particularly three phase operation. Only those skilled in the art will recognize that the principals therein illustrated may be applied for constructing a system to operate at any particular single or multi phase arrangement at any particular desired output frequency which may be adjusted by simply adjusting or varying the frequency of the output from the frequency source 230.

The ganging arrangement described may be expanded to include as many pairs of machines as desired by the user. It can be seen that the first pair is described with respect to FIG. 7 as an exciter 18 and main unit 20 of the type hereinbefore described and illustrated in FIGS. 1 and 2. One skilled in the art will recognize that a conventional generating system may be connected or substituted for the first pair of machines in any ganging arrangement.

In operation, it is typical to first initiate or start prime mover operation. Prime mover operation typically generates power for the secondary energy source so that the secondary energy source will become activated either by the variable or static mechanical drive (as desired for a particular application) to power the frequency source. If the secondary energy source is a battery, then switch means (not shown) may be desired so that the frequency source may be interrupted during periods of shutdown and may be connected to operate during periods of operation. Once the prime mover 10 (FIG. 1) is operating and the frequency source is generating its output, residual magnetism and the frequency source output itself will cause an electrical signal to be supplied through the machine respectively to the first machine (exciter 18) and in turn the main unit 20 to in turn generate output power at the system output 36. The governor 52 (FIG. 1), based on the type selected for a particular designed machine, may be set to operate at any particular speed or may be set to operate at variable speeds to obtain the greatest efficiency of operation independent of electrical system and electrical machine design requirements. In operation, the prime mover may be operated at a full range of rotation rates for which the prime mover is capable of operating other than at the critical speed so that the prime mover may be adjusted to deliver increased power for selected or limited periods of time when system output loads or variable output loads may be high. Thus, the user may be in a position to purchase a smaller and in turn cheaper system to satisfy continuous load requirements and short time duration high loads. Cost savings may be significant to the user. Further, significant economies may be available because the prime mover, which may be an engine or turbine, can operate at variable speeds to minimize wear and tear associated with constant high speed operation at low power requirements, as well as fuel savings associated with lower speed operations or variable speed operations related to power demand. It may be noted that output frequency is totally independent of the power unit or prime mover output shaft rotation rate. Thus, sudden load surges which may drag down prime mover rotation rate are not reflected at frequency changes and governor response lags may be less critical. For conventional generating machines, sudden load surges drag down prime mover rotation rate resulting in a reduction of frequency of the output power from the main unit and in turn undesirable changes in impedance which can, and on some occasions do, result in damage to machines connected as the output or to other equipment connected to the output as the load. Indeed, in some circumstances equipment connected to the output of the generator 12 may be particularly frequency sensitive and frequency variations may not be tolerable. Thus, expensive frequency control equipment may be required to guarantee a constant frequency supply to a particular equipment. Savings to the user can be had because such expensive equipment may not be required.

As earlier noted, generating systems hereinbefore existing require a reduction of prime mover rotation rate in order to produce output power at a frequency less than the more typical designed frequency for U.S. machinery of 60 hz. Thus, a generating system having a prime mover set to operate at 1800 rpm to generate 60 hz output power must be operated at 1500 cpm (6 pole machine) to generate 50 hz output power. This, in turn, results in a reduction or derating of machine maximum output power when the machine is to be used in systems having frequencies other than that for which it is particularly designed. However, the generating system herein disclosed does not suffer such derating because the frequency of the output power is independent of prime mover output shaft rotating rate.

Those skilled in the art will also recognize that when the prime mover is a turbine, be it steam or combustion, a generating system independent of output shaft rpm permits surge loading of multiple spool type turbines. Thus, greater energy extraction may be had from turbines in general and in particular multiple-spool type turbines resulting in a greater overall efficiency of the generating system.

It is to be understood that the embodiments of the invention above-described are merely illustrative of the application of the principals of the instant invention. Reference herein to details of the illustrated embodiment is not intended to limit the scope of the claims which themselves recite those features regarded as essential to the invention.

I claim:

1. A system for generating electrical power comprising:
   a prime mover to supply rotational torque through an output shaft at variable rotational rates different from electrical synchronous speed;
   secondary energy source means;
   a first electrical machine with a preselected number of electrical poles having a rotor and a stator, said rotor being connected to be rotated by said prime mover output shaft for rotation within said stator at rotational rates proportional to the rotational rates of said prime mover output shaft, said rotor having an electrical output, and said stator having an electrical input;
   a second shaft connected to be rotated by the prime mover output shaft to rotate at rotational rates proportional to the rotational rates of said prime mover output shaft;
   a second electrical machine with a preselected number of electrical poles having a rotor and a stator, said rotor being connected to said second shaft for rotation thereby within said stator, said rotor having an electrical input, and said stator having an electrical output;
   first conductor means interconnecting the electrical output of the rotor of said first machine with the electrical input of the rotor of said second machine;
   system output means conductively connected by conductor means to the output of the stator of said second machine to act as an electrical power output;
   a voltage sensor conductively connected to said system output means to sense the electrical output voltage and to supply an output signal reflective of the magnitude of the system output voltage;
   a frequency source having a first input adapted to receive energy from said secondary energy source of said prime mover, a second input conductively connected to receive the output signal of said voltage sensor and an output conductively connected to the stator input of said first electrical machine, said frequency source having means to generate an electrical output signal at a preselected fixed frequency at variable power levels, which power levels are related to the magnitude of said system output voltage to maintain said system output voltage at a preselected magnitude;
   wherein the frequency source output signal acts as a field signal and is connected to generate a magnetic field in said first machine stator which rotates directionally relative to the direction of rotation of the first machine rotor shaft to generate an output from said first machine rotor output having a frequency which varies proportional to the rotor shaft rotational rate, and wherein said output from the first machine rotor is connected to the input of the second machine rotor to generate a magnetic field therein which rotates directionally relative to the direction of rotation of the prime mover shaft and said second shaft so that the frequency of the electrical power output of said system is proportional to the fixed frequency of the electrical output signal of said frequency source independent of prime mover output shaft rotational speed.

2. The system of claim 1 wherein said prime mover has a governor associated therewith to regulate prime mover output shaft rotation rate, said governor having means to receive a regulating input and to change prime mover output shaft rotation rate in relation to preselected prime mover characteristics in accordance with received signals.

3. The system of claim 2 wherein said system includes sensor means conductively connected to the system output to sense the output power and supply a signal reflective thereof via conductor means to said signal receiving means of said governor.

4. The system of claim 3 wherein said prime mover includes said secondary energy source means.

5. A system for generating electrical power comprising:
   a prime mover to supply rotational torque through an output shaft at variable rotational rates different from electrical synchronous speed;
   secondary energy source means;
   a first electrical machine with a preselected number of electrical poles having a rotor and a stator, said rotor being connected to be rotated by said prime mover output shaft for rotation within said stator at rotational rates proportional to the otational rates of said prime mover output shaft, said ro.or having an electrical output, and said stator having an electrical input;
   a second shaft connected to be rotated by the prime mover output shaft to rotate at rotational rates proportional to the rotational rates of said prime mover output shaft;
   a second electrical machine with a preselected number of electrical poles having a rotor and a stator, said rotor being connected to said second shaft for rotation thereby within said stator, said rotor having an electrical input, and said stator having an electrical output;

first conductor means interconnecting the electrical output of the rotor of said first machine with the electrical input of the rotor of said second machine;

system output means conductively connected by conductor means to the output of the stator of said second machine to act as an electrical power output;

a voltage sensor conductively connected to said system output means to sense the electrical output voltage and to supply an output signal reflective of the magnitude of the system output voltage;

a frequency source which is comprised of a frequency determinator circuit conductively connected to receive as its first input the output from said voltage sensor, to receive as its second input power from said secondary source, and to supply as its output a signal having a preselected fixed frequency at variable power levels, which power levels are related to the magnitude of said system output voltage at a preselected magnitude;

amplifier means conductively connected to receive as its first input the output signal from said frequency determinator, to receive as its second input power from said secondary source, and to supply as its output a signal which is the amplification of the determinator output, said amplifier means output being conductively connected to said first machine stator input; and wherein said amplifier output signal acts as a field signal and is connected to generate a magnetic field in said first machine stator which rotates directionally relative to the direction of rotation of the first machine rotor shaft to generate an output from said first machine rotor output having a frequency which varies proportional to the rotor shaft rotational rate, and wherein said output from the first machine rotor is connected to the input of the second machine rotor to generate a magnetic field therein which rotates directionally relative to the direction of rotation of the prime mover shaft and said second shaft so that the frequency of the electrical power output of said system is proportional to the fixed frequency of the electrical output signal of said amplifier independent of prime mover output shaft rotational speed.

6. The system of claim 5 wherein said frequency determinator includes means to vary the preselected output frequency of said frequency source and wherein said secondary energy source is a source of direct current power.

7. The system of claim 6 wherein said frequency determinator has means to generate a multiphase output signal and wherein said amplifier means has one amplifier circuit for each of the phases of frequency determinator output.

8. The system of claim 5 wherein said frequency source is a third electrical machine having:

a rotor conductivity connected to receive as an input the output of said voltage sensor to act as the field signal of said machine;

drive means connected to said rotor and to said secondary energy source of said prime mover to receive torque from said secondary energy source and to supply torque to said rotor to rotate said rotor at a substantially fixed preselected rate;

a stator having an output conductively connected to said stator of a first machine to supply thereto said frequency source output signal.

9. The system of claim 8 wherein said third electrical machine stator is constructed to supply a multiphase output signal as said frequency source output signal.

10. The system of claim 8 wherein said drive means has means mechanically associated therewith to vary the preselected rotation rate of the third electrical machine rotor.

11. A system for generating electrical power comprising:

a prime mover to supply rotational torque through an output shaft at variable rotational rates different from electrical synchronous speed;

secondary energy source means;

a first electrical machine with a preselected number of electrical poles having a rotor and a stator, said rotor being connected to be rotated by said prime mover output shaft for rotation within said stator at rotational rates proportional to the rotational rates of said prime mover output shaft, said rotor having an electrical output, and said stator having an electrical input;

a second shaft connected to be rotated by the prime mover output shaft to rotate at rotational rates proportional to the rotational rates of said prime mover output shaft;

a second electrical machine with a preselected number of electrical poles having a rotor and a stator, said rotor being connected to said second shaft for rotation thereby within said stator, said rotor having an electrical input, and said stator having an electrical output;

first conductor means interconnecting the electrical output of the rotor of said first machine with the electrical input of the rotor of said second machine;

system output means conductively connected by conductor means to the output of the stator of said second machine to act as an electrical power output;

a voltage sensor conductively connected to said system output means to sense the electrical output voltage and to supply an output signal reflective of the magnitude of the system output voltage;

a frequency source having a first input adapted to receive energy from said secondary energy source of said prime mover, a second input conductively connected to receive the output signal of said voltage sensor and an output conductively connected to the stator input of said first electrical machine, said frequency source having means to generate an electrical output signal at a preselected fixed frequency at variable power levels, which power levels are related to the magnitude of said system output voltage to maintain said system output voltage at a preselected magnitude;

wherein said frequency source output signal acts as a field signal and is connected to generate a magnetic field in said first machine stator which rotates directionally relative to the direction of rotation of the first machine rotor shaft to generate an output from said first machine rotor output having a frequency which varies proportional to the rotor shaft rotational rate, and wherein said output from the first machine rotor is connected to the input of the second machine rotor to generate a magnetic field therein which rotates directionally relative to the direction of rotation of the prime mover shaft and said second shaft so that the frequency of the electrical power output of said system is proportional to the fixed frequency of the electrical output signal of said frequency source independent of prime mover output shaft rotational speed; and alternate operation means comprising:
- first switch means electrically interconnected between the output from said frequency source and the stator input of said first machine, said switch means having a normal position conductively connecting the output from said frequency source with the first machine stator input and an alternate position conductively disconnecting the frequency source output from the first machine stator input, and
- alternate field signal supply means including:
  - a second input to the first machine stator,
  - a source of direct current,
  - second switch means having a normal position in which said switch is nonconductive and an alternate position in which said switch is conductive, and
  - second conductor means interconnecting said source of direct current to said second switch means and said second switch means to said second input of the first machine stator so that when said second switch means is in said alternate position, a magnetic field is generated in said first machine.

12. The system of claim 11 further including:
cross connect means conductively in circuit in said first conductor means, said cross connect means being operable between a normal position in which the output of said first machine rotor is conductively uninterrupted in supply to said second machine rotor and an alternate position in which the output of said first machine rotor is conductively connected to said second machine rotor to cause a conventional magnetic field to be generated in said second machine which rotates conventionally; and
governor means associated with said prime mover to preselect the rotational rate of said prime mover output shaft to rotate said output shaft at a rate related to the number of poles of said first and second machines to generate a system output at a preselected frequency.

13. A system for generating electrical power comprising:
- a prime mover to supply rotational torque through an output shaft at variable rotational rates different from electrical synchronous speed;
- secondary energy source means;
- a first electrical machine with a preselected number of electrical poles having a rotor and a stator, said rotor being connected to be rotated by said prime mover output shaft for rotation within said stator at rotational rates proportional to the rotational rates of said prime mover output shaft, said rotor having an electrical output, and said stator having an electrical input;
- a second shaft connected to be rotated by the prime mover output shaft to rotate at rotational rates proportional to the rotational rates of said prime mover output shaft;
- a second electrical machine with a preselected number of electrical poles having a rotor and a stator, said rotor being connected to said second shaft for rotation thereby within said stator, said rotor having an electrical input, and said stator having an electrical output;
- first conductor means interconnecting the electrical output of the rotor of said first machine with the electrical input of the rotor of said second machine;
- system output means conductively connected by conductor means to the output of the stator of said second machine to act as an electrical power output;
- a voltage sensor conductively connected to said system output means to sense the electrical output voltage and to supply an output signal reflective of the magnitude of the system output voltage;
- a frequency source having a first input adapted to receive energy from said secondary energy source of said prime mover, a second input conductively connected to receive the output signal of said voltage sensor and an output conductively connected to the stator input of said first electrical machine, said frequency source having means to generate an electrical output signal at a preselected fixed frequency at variable power levels, which power levels are related to the magnitude of said system output voltage to maintain said system output voltage at a preselected magnitude;
- wherein said frequency source output signal acts as a field signal and is connected to generate a magnetic field in said first machine stator which rotates directionally relative to the direction of rotation of the first machine rotor shaft to generate an output from said first machine rotor output having a frequency which varies proportional to the rotor shaft rotational rate, and wherein said output from the first machine rotor is connected to the input of the second machine rotor to generate a magnetic field therein which rotates directionally relative to the direction of rotation of the prime mover shaft and said second shaft so that the frequency of the electrical power output of said system is proportional to the fixed frequency of the electrical output signal of said frequency source independent of prime mover output shaft rotational speed; and
- at least one ganging pair of electrical machines mechanically and electrically connected in subsequent sequence to said second electrical machine, each pair having:
  - a first ganging shaft connected to be rotated by said prime mover output shaft at a rotational rate proportional to the rotational rate of said prime mover output shaft,
  - a first ganging electrical machine with a preselected number of electrical poles having a rotor and a stator, said rotor being connected to said first ganging shaft for rotation thereby within said stator, said rotor having an electrical output and said stator having an electrical input,
  - first ganging conductor means conductively connected to the said output means of said second machine stator and to said first ganging machine stator input to supply a rotating magnetic field to said first ganging machine,
  - a second ganging shaft connected to be rotated by said prime mover output shaft at a rotational rate proportional to the rotational rate of said prime mover output shaft,
  - a second ganging machine with a preselected number of electrical poles having a rotor and a stator, said rotor being connected to said second ganging shaft for rotation thereby within said stator, said rotor having an input and said stator having an output, second ganging conductor means conductively connected to the output of said first ganging machine rotor output and to said second ganging machine rotor input to supply a magnetic field to said second ganging machine, said magnetic field rotating directionally relative to the direction of rotation of the prime mover output shaft to generate an output from said second ganging machine stator having a preselected frequency independent of prime mover rotation rate, and wherein the output of said second ganging machine is connected to the stator of the first machine of the next pair and wherein said system output means is connected to the output of the second ganging machine stator of the last sequential pair of ganging machines.

14. In an electrical power generating system of the type having electrical regulating means and a prime mover which delivers rotational torque at a preset rate through an output shaft connected to first and second electrical machines each having a stator and a rotor, and wherein the first and second electrical machines are conductively connected to generate electrical power at a set frequency proportional to prime mover output shaft rotational rate at a system output connected to the stator of the second electrical machine, the improvement wherein:

said prime mover is adapted to deliver said rotational torque at variable rates of rotation different from electrical synchronous speed;

a secondary source of energy;

said regulating means has a voltage sensor conductively connected to said system output to sense the voltage thereof and to supply at its output a signal reflective of the magnitude of the system output voltage, and a frequency source having a first input adapted to receive energy from said secondary energy source, a second input conductively connected to receive the output signal of said voltage sensor and an output conductively connected to the stator input of said first machine, said frequency source having means to generate an electrical output signal at a fixed frequency at variable power levels, which power levels are related to the magnitude of said system output voltage to maintain said system output voltage at a preselected magnitude;

wherein said frequency source output signal acts as a field signal and is connected to generate a magnetic field in said first machine stator which rotates directionally relative to direction of rotation of the prime mover output shaft to generate an output from said first machine rotor output having a frequency which varies proportional to the rotor shaft rotational rate, and wherein said output from the first machine rotor is connected to the input of the second machine rotor to generate a magnetic field wherein which rotates directionally relative to the direction of rotation of the prime mover shaft so that the frequency of the electrical power output of said system is proportional to the fixed frequency of the electrical output signal of said frequency source independent of prime mover output shaft rotational rate.

15. In an electrical power generating system of the type having electrical regulating means and a prime mover which delivers rotational torque at a preset rate through an output shaft connected to first and second electrical machines each having a stator and a rotor, and wherein the first and second electrical machines are conductively connected to generate electrical power at a set frequency proportional to prime mover output shaft rotational rate at a system output connected to the stator of the second electrical machine, the improvement wherein;

said prime mover is adapted to deliver said rotational torque at variable rates of rotation different from electrical synchronous speed;

a secondary source of energy; and said regulating means has a voltage sensor conductively connected to said system output to sense the voltage thereof and to supply at its output a signal reflective of the magnitude of the system output voltage, and a frequency source which includes:

a frequency determinator conductively connected to receive as its first input the output from said voltage sensor, to receive as its second input power from said secondary energy source, and to supply as its output a signal having a preselected fixed frequency at variable power levels, which power levels are related to the magnitude of the system output voltage to maintain said system output voltage at a preselected magnitude, said frequency determinator having means to vary said preselected fixed frequency, amplifier means conductively connected to receive at its first input the output signal from said determinator, to receive at its second input power from said direct current source and to supply at its output a signal which is the amplification of the determinator output, said amplifier means output being conductively connected to said first machine stator to act as said frequency source output, and wherein said frequency source output signal acts as a field signal and is connected to generate a magnetic field in said first machine stator which rotates directionally relative to direction of rotation of the prime mover output shaft to generate an output from said first machine rotor output having a frequency which varies proportional to the rotor shaft rotational rate, and wherein said output from the first machine rotor is connected to the input of the second machine rotor to generate a magnetic field therein which rotates directionally relative to the direction of rotation of the prime mover shaft so that the frequency of the electrical power output of said system is proportional to the fixed frequency of the electrical output signal of said frequency source independent of prime mover output shaft rotational rate.

16. The improvement of claim 15 wherein said frequency signal is a third electrical machine having:

a rotor conductively connected to receive as an input the output of said voltage sensor to act as the field signal of said machine;

drive means connected to said rotor and to said secondary energy source of said prime mover to receive torque from said secondary energy source and to supply torque to said rotor to rotate said rotor at a substantially fixed preselected rate;

a stator having an output conductively connected to said stator of said first machine to supply thereto said frequency source output signal.

17. In an electrical power generating system of the type having electrical regulating means and a prime mover which delivers rotational torque at a preset rate through an output shaft connected to first and second electrical machines each having a stator and a rotor, and wherein the first and second electrical machines are conductively connected to generate electrical power at a set frequency proportional to prime mover output shaft rotational rate at a system output connected to the stator of the second electrical machine, the improvement wherein:

said prime mover is adapted to deliver said rotational torque at variable rates of rotation different from electrical synchronous speed;

a secondary source of energy;

said regulating means has a voltage sensor conductively connected to said system output to sense the voltage thereof and to supply at its output a signal reflective of the magnitude of the system output voltage, and a frequency source having a first input adapted to receive energy from said secondary energy source, a second input conductively connected to receive the output signal of said voltage sensor and an output conductively connected to the stator input of said first machine, said frequency source having means to generate an electrical output signal at a fixed frequency at variable power levels, which power levels are related to the magnitude of said system output voltage to maintain said system output voltage at a preselected magnitude;

wherein said frequency source output signal acts as a field signal and is connected to generate a magnetic field in said first machine stator which rotates directionally relative to direction of rotation of the prime mover output shaft to generate an output from said first machine rotor output having a frequency which varies proportional to the rotor shaft rotational rate, and wherein said output from the first machine rotor is connected to the input of the second machine rotor to generate a magnetic field therein which rotates directionally relative to the direction of rotation of the prime mover shaft so that the frequency of the electrical power output of said system is proportional to the fixed frequency of the electrical output signal of said frequency source independent of prime mover output shaft rotational rate; and alternate operation means comprising:

first switch means electrically interconnected between the output from said frequency source and the stator input of said first machine, said switch means having a normal position conductively connecting the output from said frequency source with the first machine stator input and an alternate position conductively disconnecting the frequency source output from the first machine stator input, alternate field signal supply means including;
a second input to the first machine stator,
a source of direct current,
second switch means having a normal position in which said switch is nonconductive and an alternate position in which said switch is conductive, second conductor means interconnecting said source of direct current to said second switch means and said second switch means to said second input of the first machine stator so that when said second switch means is in said alternate position, a magnetic field is generated in said first machine, cross connect means conductively connected in circuit in said first conductor means, said cross connect means being operable between a normal position in which the output of said first machine rotor is conductively uninterrupted in supply to said second machine rotor and an alternate position in which the output of said first machine rotor is conductively connected to said second machine rotor to cause a conventional magnetic field to be generated in said second machine which rotates conventionally, means associated with said prime mover to preselect the rotational rate of said prime mover output shaft to rotate said output shaft at a rate related to the number of poles of said first and second machines to generate a system output at a preselected frequency.

18. In an electrical power generating system of the type having electrical regulating means and a prime mover which delivers rotational torque at a preset rate through an output shaft connected to first and second electrical machines each having a stator and a rotor, and wherein the first and second electrical machines are conductively connected to generate electrical power at a set frequency proportional to prime mover output shaft rotational rate at a system output connected to the stator of the second electrical machine, the improvement wherein:

said prime mover is adapted to deliver said rotational torque at variable rates of rotation different from electrical synchronous speed;

a secondary source of energy;

said regulating means has a voltage sensor conductively connected to said system output to sense the voltage thereof and to supply at its output a signal reflective of the magnitude of the system output voltage, and a frequency source having a first input adapted to receive energy from said secondary energy source, a second input conductively connected to receive the output signal of said voltage sensor and an output conductively connected to the stator input of said first machine, said frequency source having means to generate an electrical output signal at a fixed frequency at variable power levels, which power levels are related to the magnitude of said system output voltage to maintain said system output voltage at a preselected magnitude;

wherein said frequency source output signal acts as a field signal and is connected to generate a magnetic field in said first machine stator which rotates directionally relative to direction of rotation of the prime mover output shaft to generate an output from said first machine rotor output having a frequency which varies proportional to the rotor shaft rotational rate, and wherein said output from the first machine rotor is connected to the input of the second machine rotor to generate a magnetic field therein which rotates directionally relative to the direction of rotation of the prime mover shaft so that the frequency of the electrical power output of said system is proportional to the fixed frequency of the electrical output signal of said frequency source independent of prime mover output shaft rotational rate; and at least one ganging pair of electrical machines mechanically and electrically connected in subsequent sequence to said second electrical machine, each pair having:

a first ganging shaft connected to be rotated by said prime mover output shaft at a rotational rate proportional to the rotational rate of said prime mover output shaft, a first ganging electrical machine with a preselected number of electrical poles having a rotor and a stator, said rotor being connected to said first ganging shaft for rotation thereby within said stator, said rotor having an electrical output and said stator having an electrical input, first ganging conductor means conductively connected to the said output means of said second machine stator and to said first ganging machine stator input to supply a rotating magnetic field to said second ganging machine, a second ganging shaft connected to be rotated by said prime mover output shaft at a rotational rate proportional to the rotational rate of said prime mover output shaft, a second ganging machine with a preselected number of electrical poles having a rotor and a stator, said rotor being connected to said second ganging shaft for rotation thereby within said stator, said rotor having an input and said stator having an output, second ganging conductor means conductively connected to the output of said first ganging machine rotor output and to said second ganging machine rotor input to supply a magnetic field to said second ganging machine, said magnetic field rotating directionally relative to the direction of rotation of the prime mover output shaft to generate an output from said second ganging machine stator having a preselected frequency independent of prime mover rotation rate, and wherein said system output means is connected to the output of the second ganging machine stator of the last sequential pair of ganging machines.

* * * * *